US008705375B2

(12) United States Patent
Jaakkola et al.

(10) Patent No.: US 8,705,375 B2
(45) Date of Patent: Apr. 22, 2014

(54) POWER SAVE PROTOCOL INTEROPERABILITY DETECTION

(75) Inventors: Mikko Jaakkola, Lempaala (FI); Jari Torkkel, Itasalmi (FI)

(73) Assignee: Nokia Corporation, Espoo (FI)

( * ) Notice: Subject to any disclaimer, the term of this patent is extended or adjusted under 35 U.S.C. 154(b) by 1378 days.

(21) Appl. No.: 11/807,170

(22) Filed: May 24, 2007

(65) Prior Publication Data

US 2008/0291838 A1    Nov. 27, 2008

(51) Int. Cl.
*H04L 12/26* (2006.01)
(52) U.S. Cl.
USPC ........... 370/242; 370/311; 370/318; 370/328; 370/329; 370/338; 455/550.1; 455/574; 455/451; 455/343.1; 455/343.2
(58) Field of Classification Search
USPC ........... 455/574, 560, 343.1–343.6, 572, 451; 370/328, 329, 318, 311, 338, 389, 242
See application file for complete search history.

(56) References Cited

U.S. PATENT DOCUMENTS

| | | | |
|---|---|---|---|
| 6,079,025 A | 6/2000 | Fung | |
| 7,295,827 B2 * | 11/2007 | Liu et al. | 455/343.2 |
| 7,505,795 B1 * | 3/2009 | Lim et al. | 455/574 |
| 7,577,113 B2 * | 8/2009 | Alon et al. | 370/338 |
| 2003/0161341 A1 | 8/2003 | Wu et al. | |
| 2004/0160927 A1 * | 8/2004 | Yang et al. | 370/338 |
| 2004/0202122 A1 * | 10/2004 | Backes | 370/329 |
| 2005/0221869 A1 | 10/2005 | Liu et al. | 455/574 |
| 2006/0007924 A1 * | 1/2006 | Sadot | 370/389 |
| 2006/0094477 A1 * | 5/2006 | Rivera-Cintron et al. | 455/574 |
| 2006/0229023 A1 | 10/2006 | Alon et al. | 455/69 |
| 2007/0232358 A1 * | 10/2007 | Sherman | 455/560 |
| 2007/0248039 A1 * | 10/2007 | Backes et al. | 370/328 |

FOREIGN PATENT DOCUMENTS

| | | |
|---|---|---|
| CN | 1689346 A | 10/2005 |
| CN | 1771693 A | 5/2006 |

OTHER PUBLICATIONS

International Search Report issued Nov. 4, 2008 in International Patent Application No. PCT/IB2008/051616 filed on Apr. 25, 2008.
IEEE WLAN 802.11, "Part 11: Wireless LAN medium access control (MAC) and physical layer (PHY) specifications," IEEE Standards, US, Jun. 26, 1997, pp. 128-136 (XP008071059).
E. Jung et al., "An energy efficient MAC protocol for wireless LANs," IEEE, 2002, pp. 1756-1764 (XP10593744A).

* cited by examiner

*Primary Examiner* — Kiet Doan
*Assistant Examiner* — Michael T Vu
(74) *Attorney, Agent, or Firm* — Harrington & Smith

(57) ABSTRACT

The present invention provides a method and apparatus featuring performing detection functionality to determine if a wirelessly connected node, point or terminal in a wireless network configured to operate according a predefined power saving scheme operates incorrectly; and adjusting the predefined power saving scheme when wirelessly connected with the particular node, point or terminal if an incorrect power saving operation is detected. The detection functionality may include probing types of power saving protocol tests and using lower and higher-layer protocol information to detect if the mobile device might be missing some data. The adjusting may include: 1) disabling the predefined power saving scheme, or 2) switching entering into the predefined power savings scheme only after a predefined inactivity period, wherein the predefined inactivity is substantially longer than in "normal" operation.

33 Claims, 4 Drawing Sheets

The Basic WLAN Enabled Device

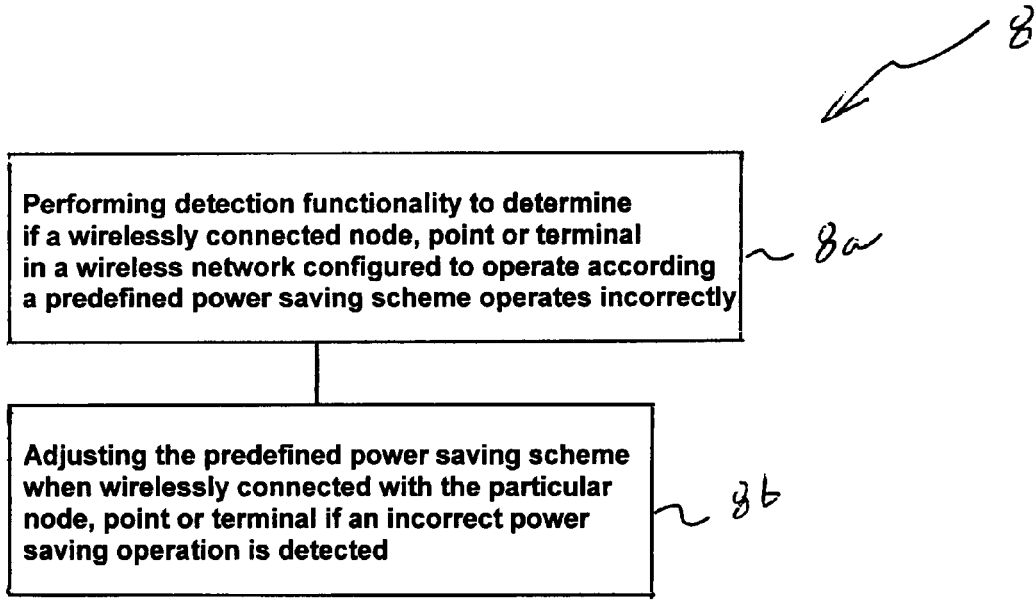
Figure 2: The Basic Method
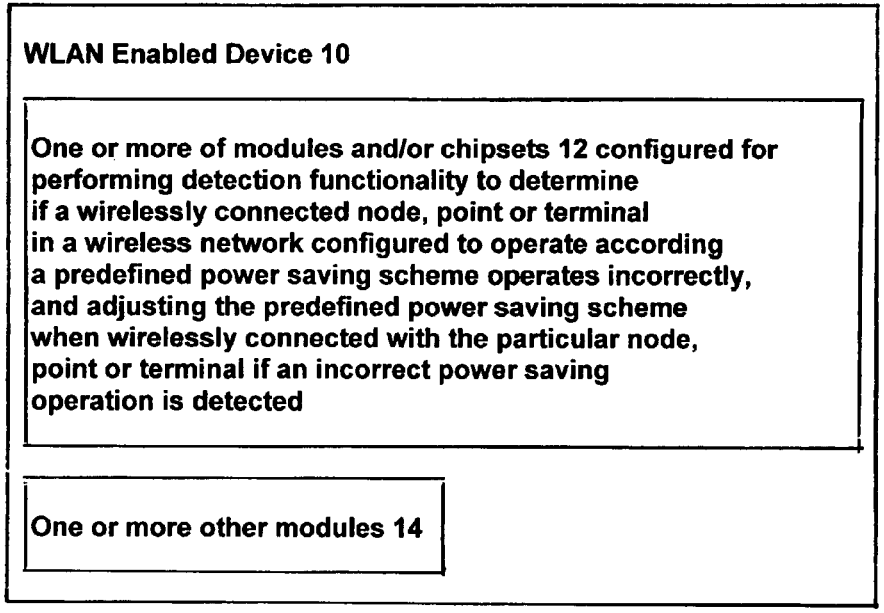
Figure 3: The Basic WLAN Enabled Device

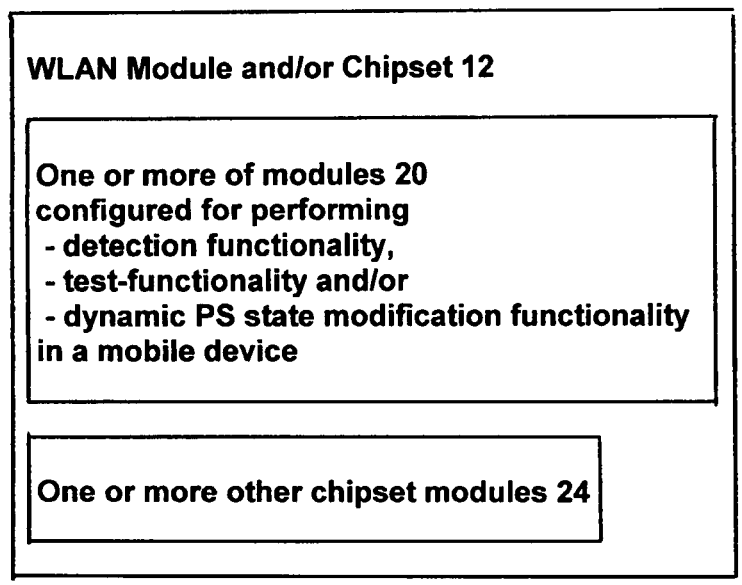
Figure 4: The Basic WLAN Module or Chipset

POWER SAVE PROTOCOL INTEROPERABILITY DETECTION

BACKGROUND OF THE INVENTION

1. Field of Invention

The present invention relates to wireless network communication and more particularly to a method and apparatus for providing a mobile terminal with a technique to detect whether a power save mode of an access point (AP) servicing the mobile terminal is working properly.

2. Description of Related Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate wireless communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth® is an example of a short-range wireless technology quickly gaining acceptance in the marketplace. A user does not actively instigate a Bluetooth® network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth® other popular short-range wireless communication techniques include wireless local area network (WLAN) communication (of which "Wi-Fi" local access points communicating in accordance with various IEEE 802.11x standards, is an example), WUSB, UWB, ZigBee (802.15.4, 802.15.4a), and UHF RFID. All of these wireless mediums have features and advantages that make them appropriate for various applications.

In recent years, WLAN technology has become very popular because of its advantage in price and bandwidth. Nowadays, WLAN is mainly used for Internet access, but real-time application like Voice over IP (VoIP) and video on demand (Vod) are identified as the future applications for wireless LAN. To support such new applications, IEEE 802.11e was standardized to define a new 802.11 medium access control (MAC) layer protocol. The IEEE 802.11e MAC is a standard to support Quality of Service (QoS), and 802.11e Hybrid Coordination Function (HCF) can support QoS in 802.11 networks. The HCF provides both a contention-based channel access, called enhanced distributed channel access (EDCA), and a controlled channel access, referred to as HCF controlled channel access (HCCA).

Handheld devices having IEEE 802.11 WLAN can provide wireless broadband access. However, since they are generally battery-powered, power consumption is a critical issue for mobile terminals equipped with IEEE 802.11 WLAN. Therefore IEEE 802.11 provides a power saving mechanism (LegacyPS) for various devices to reduce power consumption.

However, it has been noted that quite a few WLAN APs contain a broken WLAN power save (PS) implementation despite the efforts that WiFi-alliance is putting for certification. Sometimes the implementation in WLAN AP can be considered to be correct but due to the mobile device's behaviour the interoperability is still broken. Nevertheless, a non-interoperable PS operation is a major problem for mobile devices and typically it is the mobile device that gets switched to a new one and not the infrastructure.

There is only so much that an end-user can do on the mobile device to make workarounds and after that the device is basically stuck with the WLAN infrastructure behaviour forcing the end-user to disable the utilization of the PS scheme. However, a typical end-user does not have the technical knowledge of pin-pointing the problematic behaviour to WLAN PS that makes this a bad usability problem. Disabling power save permanently would result always in weakening WLAN operating times, thus it is not a solution either.

In view of this, there is a need in the art for a technique for a mobile terminal to detect whether the power save mode of a WLAN access point (AP) is working properly and react accordingly.

SUMMARY OF THE INVENTION

The present invention provides a new and unique method and apparatus that features performing detection functionality to determine if a wirelessly connected node, point or terminal in a wireless network configured to operate according a predefined power saving scheme operates incorrectly; and adjusting the predefined power saving scheme when wirelessly connected with the particular node, point or terminal if an incorrect power saving operation is detected.

In some embodiments of the present invention, the adjusting may include: 1) disabling the predefined power saving scheme, or 2) switching entering into the predefined power savings scheme only after a predefined inactivity period, wherein the predefined inactivity is substantially longer than in "normal" operation.

In some embodiments of the present invention, the wireless network may take the form of a wireless local area network (WLAN) having a mobile device that may take the form of a station (STA), and the particular node, point or terminal may take the form of an access point (AP). The scope of the invention is intended to include other suitable wireless networks either now known or later developed in the future, including but not limited to Bluetooth® (BT), ultra wide band (UWB), wireless USB, as well as a Universal Mobile Telecommunications System (UMTS) packet network architecture, consistent with that shown and described herein.

In some embodiments of the present invention, the detection functionality may include probing types of power saving protocol tests and using lower and higher-layer protocol information to detect if the mobile device might be missing some data.

In some embodiments of the present invention, the method may include, switching to a new compatible power scheme when the predefined power saving scheme is disabled for a particular access point. The new compatible power scheme may include entering the mobile device into a power save mode after a dynamic power save detection period, including waiting for a substantially longer inactivity period like (e.g. about 10-20 seconds) than a normal inactivity period.

In some embodiments of the present invention, the detection functionality may include monitoring and registering events that can reveal states where the mobile device is missing downlink packets.

In the case where the predefined power saving scheme works, a dynamic power saving detection can be turned off for the length of an active session associated with the particular, node, point or terminal; and in the case where the predefined power saving scheme does not work, the method may include entering the mobile device into an active mode.

In some embodiments of the present invention, the method may include toggling between the predefined power saving scheme and an active mode periodically and calculating the number of received packets during an estimated power save enabled mode and the active mode in order to dynamically detect whether the predefined power saving scheme works or not. The toggling may include using symmetric toggling periods, or synchronizing toggling periods to transmitted packets, or some combination thereof.

In some embodiments of the present invention, the method may include using a destination address to make a distinction in a determination engine or other suitable module for performing the same, including determining if broadcast data might be arriving normally while unicast is not, or vice versa.

In some embodiments of the present invention, the method may include triggering test-functionality right after the mobile device goes into a sleep mode for the first time to detect if the predefined power save scheme is working. The method may also include sending frames having a proprietary level data-format to the particular node, point or terminal in such way that the destination address is the same as the source address so as to cause a frame to be buffered into the particular node, point or terminal, and once a beacon is arriving, the mobile device can pull the packet back. If the packet is echoed back normally to the mobile device, then that information can be used as a strong signal for having good interoperability.

In some embodiments of the present invention, the method may include sending a broadcast/multicast packet to see if the broadcast/multicast power save delivery works as specified, where the destination address would be either a broadcast address or multicast address.

In some embodiments of the present invention, the disabling of the predefined power save scheme may last only during the session, or it may be a permanent condition depending on the system configuration.

In some embodiments of the present invention, the method may include notifying a user of the mobile device about the problem, including providing information that the problem might cause heating or excessive power-consumption causing battery to drain faster, and/or notifying the end user with advice to update the access point.

The scope of the invention may also include implementing the same in a computer program product with a program code, which program code is stored on a machine readable carrier, for carrying out the steps of the method according to the present invention. The method may also feature implementing the step of the method via a computer program running in a processor, controller or other suitable module, for example, in such a WLAN terminal or device.

In some embodiments of the present invention, the invention may also take the form of a new and unique method that features receiving and analyzing packets received from an associated access point to determine whether the access point is operating according to rules of a predefined power saving scheme for communicating in a wireless local area network environment; and switching to an interoperability power saving communication mode in the case of detecting that the access point is not operating according to the rules of the predefined power saving scheme. In such an embodiment, the interoperability power saving communication modes may include 1) disabling the power saving scheme, or 2) switching entering into power savings scheme only after a predefined inactivity period, wherein the predefined inactivity is substantially longer than in "normal" operation.

The scope of the invention may also take the form of a chipset or other suitable module(s) for effecting the operation of the present invention described herein.

In operation, if the mobile device detects that the PS is not working well enough, then the system is able to turn it off in that particular WLAN access point. When the automatic PS is disabled for a specific AP, a new compatible PS mode can be used. In this mode, the system may enter into the power save after a very long inactivity period like 10-20 seconds. This period is called a dynamic PS detection period.

In the prior art, there is no other way to handle the situation than having a list of WLAN AP that are not interoperating with certain WLAN devices. End-user also had to make a manual mode-switch to active-mode.

The new scheme according to the present invention automates the detection and adjusts its own behaviour according to the current situation. This would result less end-user complaints and unnecessary field failure rate issues.

BRIEF DESCRIPTION OF THE DRAWING

The drawing includes the following Figures, which are not necessarily drawn to scale:

FIG. 2 shows a flow chart of the basic steps of some embodiments of the present invention.

FIG. 3 shows a WLAN enabled or mobile device according to some embodiments of the present invention.

FIG. 4 shows an exemplary WLAN module or chipset that forms part of the WLAN enabled or mobile device shown in FIG. 3 according to some embodiments of the present invention.

BEST MODE OF THE INVENTION

Figure 1:
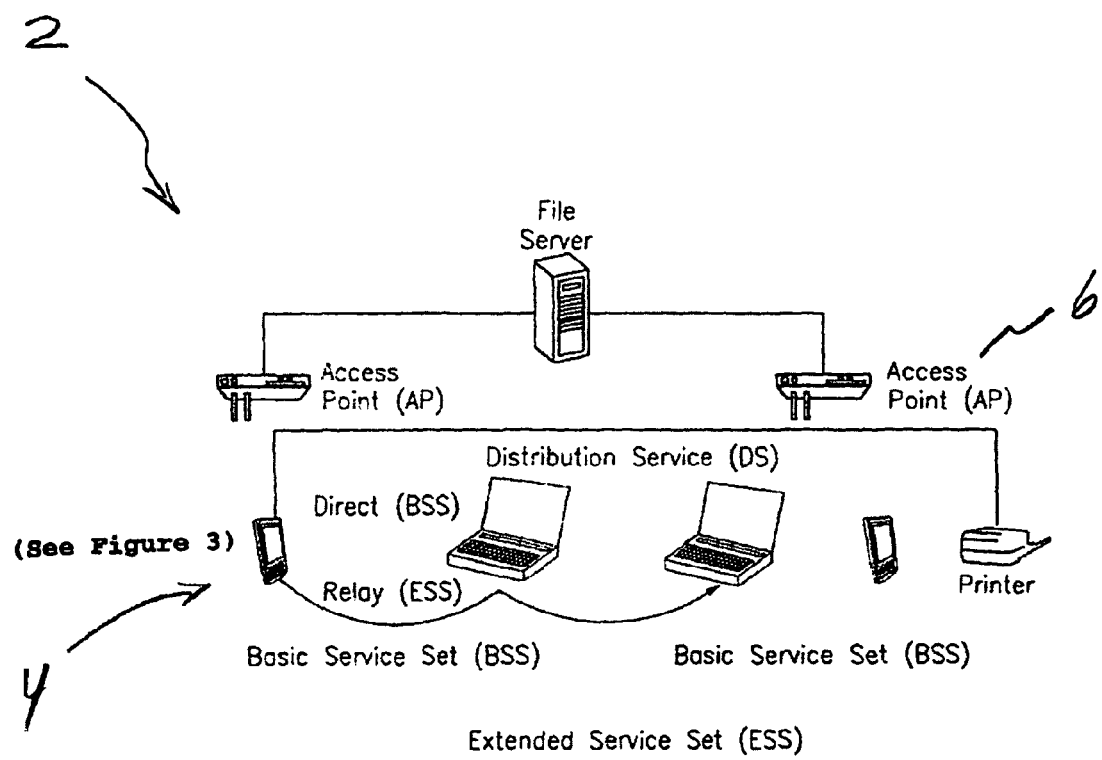
FIG. 1 shows typical parts of an IEEE 802.11 WLAN system according to some embodiments of the present invention.

FIG. 1 shows, by way of example, a wireless network according to the present invention in the form of an IEEE 802.11 WLAN system, generally indicated as 2, which provides for communications between communications equipment such as mobile and secondary devices generally-indicated as 4, including personal digital assistants 4a (PDAs), laptops 4b and printers 4c, etc. The WLAN system 2 may be connected to a wired LAN system that allows wireless devices to access information and files on a file server or other suitable device or connecting to the Internet. The devices can communicate directly with each other in the absence of a base station in a so-called "ad-hoc" network, or they can communicate through a base station, called an access point (AP) in IEEE 802.11 terminology, generally indicated as 6, with distributed services through the AP 2 using local distributed services (DS) or wide area extended services, as shown. In a WLAN system, end user access devices are known as stations 4 (STAs), which are transceivers (transmitters/receivers) that convert radio signals into digital signals that can be routed to and from communications device and connect the communications equipment to access points (APs) that receive and distribute data packets to other devices and/or networks. The STAs 4 may take various forms ranging from wireless network interface card (NIC) adapters coupled to devices to integrated radio modules that are part of the devices, as well as an external adapter (USB), a PCMCIA card or a USB Dongle (self contained), which are all known in the art. It is important to note that the scope of the invention is intended to include implementing the same in other types or kinds of wireless networks, including wireless short-range communication networks like Bluetooth® (BT), ultra wide band (UWB), wireless USB or other suitable wireless networks either now known or later developed in the future.

The present invention provides a new and unique technique for such a STA 4 to perform detection functionality to determine if a wirelessly connected node, point or terminal, such as STA 4, in a wireless network, such as WLAN 2, configured to operate according a predefined power saving scheme operates incorrectly; and adjusting the predefined power saving scheme when wirelessly connected with the particular node, point or terminal, such as the STA 4, if an incorrect power saving operation is detected.

FIG. 2 shows a flowchart generally indicated as 8 having steps 8a and 8b for implementing the inventive method according to some embodiments of the present invention.

The Basic Implementation

In particular, the STA 4 in FIG. 1 can monitor whether some packets are missed due to an improperly working power save mode in the AP 6, and if such situation is detected, the STA 4 is provided with dynamic power saving state modification functionality so that the STA 4 can disable the power saving mode, or alternatively adjust it to be operational only after long inactivity periods when associated with said AP 6 having broken power savings mode. With this kind of an arrangement the STA 4 can better adjust to the environment and maintain connectivity also to APs such as 6 having improperly operating power saving modes.

The whole thrust of the present invention here is to provide a new technique that features receiving and analyzing packets received from the AP 6 to determine whether it is operating according to rules of a predefined power saving scheme for communicating in a wireless local area network environment, such as WLAN 2; and switching to an interoperability power saving communication mode in the case of detecting that the AP 6 is not operating according to the rules of the predefined power saving scheme. When using such a technique, the interoperability power saving communication modes may include 1) disabling the power saving scheme, or 2) switching entering into power savings scheme only after a predefined inactivity period, wherein the predefined inactivity is substantially longer than in "normal" operation. The new technique includes implementations containing three different functionalities, which include detection functionality, test-functionality and dynamic PS state modification functionality, as follows:

Detection Functionality

The purpose of the detection functionality is to monitor the system and register events that can reveal states where the WLAN device 4 is missing downlink packets.

The monitoring system has to resolve whether WLAN PS works or does not work in the connected AP 6.

In case where the PS works, then the dynamic PS detection will be turned off for the length of the active WLAN session associated with the particular, node, point or terminal. It is also possible to cache or even save the working WLAN AP Basic Service Set Identification (BSSID) for later use in order to improve the usability.

In case where the PS appears not to work, the system needs to disable the PS by entering into the Active Mode (AM).

In order to further improve the power consumption, the system could enable the PS in certain cases for a limited period. The PS could also be enabled after a certain transmission inactivity period, and disabled immediately when there is a packet to be transmitted.

The method for dynamically detecting whether the PS works or not is to toggle between the PS and AM periodically and calculate the number of received packets during an estimated PS enabled and AM. If the PS does not work, all packets should be received during the AM period and zero packets during the PS period. The destination address can also be used to make a distinction in a determination engine or other suitable module such as 12 (see FIG. 3), e.g. broadcast data might be arriving normally but unicast isn't or vice versa. Similarly, if the PS works, then receiving one packet during the PS should be a strong indication that the PS works—especially if receiving both unicast and broadcast packets, then that is even a better indication about the interoperability. Receiving two or more packets with both types typically means that the PS works correctly.

The method according to the present invention provides improvements in a number of different ways:

1) Relaying a WLAN Firmware (FW) indication in which mode the packet was actually received: The FW can retrieve this information by first seeing activity in beacon traffic indication message (TIM) values and then by using a PS-Poll control frame to request the AP to send data as a reply to the PS-Poll. Receiving one packet during the power save operation is a strong proof of a working PS implementation. Unfortunately, the WLAN standard specifies that all traffic sent by a WLAN AP is always sent with a PS-bit cleared, which makes it impossible for the client to determine the terminal PS-state from the WLAN AP point of view. This means that the upper layer has to make a conclusion itself and has to perform some filtering for possible errors resulting in a slightly longer detection period as a single packet cannot be used always as 100% reliable results. In spite of this, partially working WLAN AP implementations could indicate that the station is in the PS-mode but they would just work incorrectly in some other ways.

2) Using upper layer protocol retransmission count as indication of the PS problem: For example, protocols such as TCP and DNS/UDP resends packets in the case of no reply received in a specified time. The system could enter into the Active Mode (AM) mode when upper layer retransmissions reach certain limits, and if the reply is received for the next retransmitted packets it is alone a strong indication that the PS does not work correctly. The upper layer protocol information if enabled could also be used for controlling dynamic PS detection state.

The exact dynamic PS toggle period has an important role in order to get detection fast and reliable enough. When the system has a large number activity, it typically never enters into the PS mode resulting in the fact that no conclusion can be done. The PS problem typically arises when a single DNS session is used to resolve the single IP-address or when a single TCP or HTTP socket is active. Thus the problems often occurs in the very beginning or in the end of the session.

As the reply to the packet is expected to be received within 5 seconds in normal conditions, the toggling period needs to be synchronised to the packet transmission in such a way that the reply should be received both in the PS enabled and disabled states.

There are number of options for determining the optimal toggling sequence/period, as follows:

1) Use symmetric periods, for example, about a 3 second timeout for toggling: Using shorter periods increases the risk that the reply is not received fast enough possibly resulting in the reply being lost as the PS will be disabled, while a longer period may result in shorter detection.

2) Synchronize the period to the transmitted packets: The TCP and DNS/UDP retransmission interval is also dynamically increasing (for example, it could be 1 s, 2 s, 5 s, 10 s, 20 s, 40 s or 1 s, 2 s and then every 5 s), The detection period length might be quite long in certain cases. If there is a lot of traffic the system, in practice, does not enter into the PS state at all resulting in a long detection period anyway. On the other hand, if there is small number of activity it also might results a long detection period. The long detection period does not cause any side-effect as the system still works. When the system halts the toggling to AM mode, it will typically trigger the upper layer protocol to recover.

Test-Functionality

Test-functionality is used for verifying the assumptions of a correctly working or not correctly working WLAN AP PS scheme. Test-functionality is triggered right after the WLAN device goes into a sleep for the first time to detect if the basic PS modes are working in an interoperable way. After entering into the PS mode for the first time, the test-functionality sends 802.11 frames having proprietary L2 level data-format to WLAN AP in such way that the destination address is the same as the source address. This causes the WLAN frame to be buffered in the WLAN AP (normal WLAN PS behavior) and once the beacon is arriving, the WLAN device can pull the packet back. If the packet is echoed back normally to the WLAN device, then that information can be used as a strong signal for having good interoperability. The same test can also be done using broadcast/multicast packet to see if the broadcast/multicast PS delivery works as specified. In this case, the destination address would be either a broadcast address or multicast address. These two tests can be done separately or one after another.

Dynamic PS State Modification Functionality

If the test-functionality gives a signal to the system about problematic PS behavior, then dynamic PS state modification functionality is configured to disable the PS in the WLAN device. Disabling the PS when being connected to that particular WLAN AP can last only during the session or it may be a permanent condition depending on the system configuration. The dynamic PS state modification functionality may also trigger a user interface (UI) notification to the end-user telling them that there are problems in the WLAN PS that might cause, for example, heating or excessive power-consumption causing the battery to drain faster. In addition, advice to update the WLAN AP can be given to the end-user via the UI.

Device Implementation

Figure 5A:
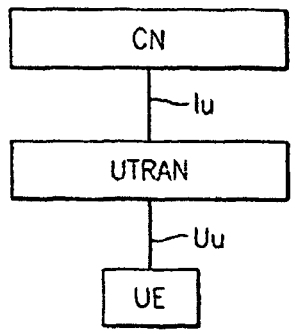
FIGS. 5a and 5b show diagrams of a Universal Mobile Telecommunications System (UMTS) packet network architecture according to some embodiments of the present invention.
Figure 5B:
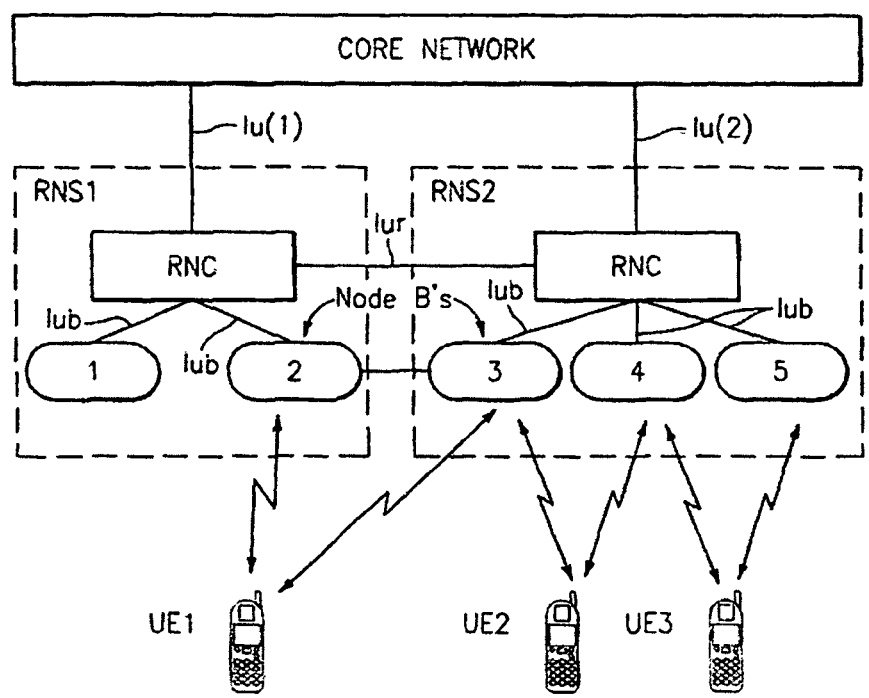

FIG. 3 shows a node, point, terminal or device 4 in the form of a WLAN enabled or mobile device generally indicated 10 according to one embodiment of the present invention for a wireless local area network (WLAN) or other suitable network such as that shown in FIGS. 1, 5a and 5b. The WLAN enabled device 10 has one or more WLAN modules or chipsets 12 (see also FIG. 4) configured for performing detection functionality to determine if a wirelessly connected node, point or terminal in a wireless network configured to operate according a predefined power saving scheme operates incorrectly and for adjusting the predefined power saving scheme when wirelessly connected with the particular node, point or terminal if an incorrect power saving operation is detected in the node, point, terminal or mobile device, such as the station (STA) 4 in FIG. 1, in the wireless local area network (WLAN) 2 in FIG. 1, or other suitable network, according to some embodiments of the present invention. The WLAN enabled device 10 may also have one or more other modules 14 for performing one or more other functions that do not form part of the underlying invention, ad thus are not described in detail herein. The WLAN enabled device 10 may take the form of such a station (STA) or other suitable node, point, terminal or device either now known or developed in the future for operating in such a wireless local area network (WLAN) or other suitable network such as that shown in FIGS. 1, 5a and 5b.

FIG. 4 shows, by way of example, the WLAN module and/or chipset 12 in further detail, having one or more modules 20 configured for performing detection functionality, test-functionality and/or dynamic PS state modification functionality as described herein in such a node, point, terminal or mobile device, according to one embodiment of the present invention. The WLAN chipset 12 may also include other chipset modules 24 that do not necessarily form part of the underlying invention and are not described in detail herein, including a baseband module, a MAC module, a host interface module. Although the present invention is described in the form of a stand alone module for the purpose of describing the same, the scope of the invention is invention is intended to include the functionality of the module 20 being implemented in whole or in part by one or more of these other chipset modules 24. In other words, the scope of the invention is not intended to be limited to where the functionality of the present invention is implemented in the WLAN chipset 12.

Implementation of the Functionality of Module 12 and/or 20

By way of example, and consistent with that described herein, the functionality of the module 12 and/or 20 may be implemented using hardware, software, firmware, or a combination thereof, although the scope of the invention is not intended to be limited to any particular embodiment thereof. In a typical software implementation, the module 12 and/or 20 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the module 18 being a stand alone module, as shown, or in the combination with other circuitry for implementing another module. Moreover, the real-time part may be implemented in hardware, while non real-time part may be done in software.

The other chipset modules 24 may also include other modules, circuits, devices that do not form part of the underlying invention per se. The functionality of the other modules, circuits, device that do not form part of the underlying invention are known in the art and are not described in detail herein.

The WLAN Chipset

The present invention may also take the form of the WLAN chipset 12 for a node, point, terminal or device in a wireless local area network (WLAN) or other suitable network, that may include a number of integrated circuits designed to perform one or more related functions. For example, one chipset may provide the basic functions of a modem while another provides the CPU functions for a computer. Newer chipsets generally include functions provided by two or more older chipsets. In some cases, older chipsets that required two or more physical chips can be replaced with a chipset on one chip. The term "chipset" is also intended to include the core functionality of a motherboard in such a node, point, terminal or device.

By way of example, such a chipset according to some embodiments of the present invention may take the form of and include a first chipset module configured for performing detection functionality to determine if a wirelessly connected node, point or terminal in a wireless network configured to operate according a predefined power saving scheme operates incorrectly; and a second chipset module coupled with the first chipset module and configured for adjusting the predefined power saving scheme when wirelessly connected with the particular node, point or terminal if an incorrect power saving operation is detected.

Moreover, according to some embodiments of the present invention the chipset may also take the form of and include a first chipset module configured for receiving and analyzing packets received from an associated access point to determine whether the associated access point is operating according to rules of a predefined power saving scheme for communicating in a wireless local area network environment; and a second chipset module coupled with the first chipset module and configured for switching to an interoperability power saving communication mode in the case of detecting that the associated access point is not operating according to the rules of the predefined power saving scheme.

The scope of the invention is also intended to include implementations of in chipset configurations either now known or later developed in the future.

Universal Mobile Telecommunications System (UMTS) Packet Network Architecture FIGS. 5a and 5b show diagrams of the Universal Mobile Telecommunications System (UMTS) packet network architecture. In FIG. 5a, the UMTS packet network architecture includes the major architectural elements of user equipment (UE), UMTS Terrestrial Radio Access Network (UTRAN), and core network (CN). The UE is interfaced to the UTRAN over a radio (Uu) interface, while the UTRAN interfaces to the core network (CN) over a (wired) Iu interface. FIG. 5b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 5a. A given UE may be in radio contact with multiple Node Bs even if one or more of the Node Bs are connected to different RNCs. For instance, a UE1 in FIG. 5b may be in radio contact with Node B2 of RNS1 and Node B3 of RNS2 where Node B2 and Node B3 are neighboring Node Bs. The RNCs of different RNSs may be connected by an Iur interface which allows mobile UEs to stay in contact with both RNCs while traversing from a cell belonging to a Node B of one RNC to a cell belonging to a Node B of another RNC. The convergence of the IEEE 802.11 WLAN system in FIG. 1 and the (UMTS) packet network architecture in FIGS. 5a and 5b has resulted in STAs taking the form of UEs, such as mobile phones or mobile terminals. The interworking of the WLAN (IEEE 802.11) shown in FIG. 1 with such other technologies (e.g. 3GPP, 3GPP2 or 802.16) such as that shown in FIGS. 5a and 5b is being defined at present in protocol specifications for 3GPP and 3GPP2. The scope of the invention is intended to include implementing the same in such a UMTS packet network architecture as shown in FIGS. 5a and 5b.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:
1. A method comprising:
receiving packets from a network node and using at least the received packets to detect whether a predefined power saving scheme of said network node operates incorrectly; and
adjusting the predefined power saving scheme to an interoperability power saving communication mode when wirelessly connected with said network node if it is detected that the predefined power saving scheme operates incorrectly;

wherein said detecting comprises probing types of power saving protocol tests and using lower and higher-layer protocol information to detect if some data to be received is missing.

2. The method according to claim 1, wherein the adjusting comprises switching to a new compatible power scheme when the predefined power saving scheme is disabled for the network node in response to detecting that the predefined power saving scheme operates incorrectly.

3. The method according to claim 1, wherein the adjusting comprises entering into the predefined power saving scheme only after a predefined inactivity period, wherein the predefined inactivity is substantially longer than in "normal" operation.

4. The method according to claim 1, wherein said detecting comprises monitoring and registering events that can reveal states where downlink packets are missing.

5. The method according to claim 1, further comprising, in a case it is detected that the predefined power saving scheme operates correctly, turning off a dynamic power saving detection for a length of an active session associated with said network node.

6. The method according to claim 1, further comprising, in a case it is detected that the predefined power saving scheme operates incorrectly, entering into an active mode.

7. The method according to claim 1, wherein the detecting comprises toggling between a power save enabled mode and an active mode periodically and calculating a number of the received packets during the power save enabled mode and the active mode.

8. The method according to claim 7, comprising: after entering the power save enabled mode sending data to said network node using a broadcast address or a multicast address as a destination address to make a distinction in a determination engine; and determining whether the broadcast or the multicast data is received and that unicast data is not received or vice versa in response to the sending.

9. The method according to claim 7, comprising: after entering the power save enabled mode sending a frame having a proprietary level data-format to the network node in such way that the destination address is the same as the source address so as to cause the frame to be buffered into said network node.

10. The method according to claim 9, wherein the detecting comprises determining if the frame is echoed back normally in response to the sending.

11. The method according to claim 9, comprising receiving a beacon in response to the sending; and based on the receiving pulling the frame back from said network node.

12. The method according to claim 1, wherein the method further comprises implementing the method via a computer program running in a processor, controller or other suitable module in a mobile device.

13. An apparatus comprising:
at least one processor, and
at least one memory including computer program code, and
the computer program code configured to, with the at least one processor, cause the apparatus to at least:
packets from a network node and use at least the received packets detect whether a predefined power saving scheme of said network node operates incorrectly; and
adjust the predefined power saving scheme to an interoperability power saving communication mode when wirelessly connected with said network node if it is detected that the predefined power saving scheme operates incorrectly;

wherein said detecting comprises probing types of power saving protocol tests and using lower and higher-layer protocol information to detect if some data to be received is missing.

14. The apparatus according to claim 13, wherein the at least one memory including the computer program code is configured with the at least one processor to cause the apparatus to switch to a new compatible power scheme when the predefined power saving scheme is disabled for the network node in response to detecting that the predefined power saving scheme operates incorrectly.

15. The apparatus according to claim 13, wherein the at least one memory including the computer program code is configured with the at least one processor to cause the apparatus to enter into the predefined power saving scheme only after a predefined inactivity period, wherein the predefined inactivity is substantially longer than in "normal" operation.

16. The apparatus according to claim 13, wherein said detecting comprises monitoring and registering events that can reveal states where the apparatus is missing downlink packets.

17. The apparatus according to claim 13, wherein the at least one memory including the computer program code is configured with the at least one processor to, in the case where the predefined power saving scheme works, cause the apparatus to stop the detecting for a length of an active session associated with said network node.

18. The apparatus according to claim 13, wherein the at least one memory including the computer program code is configured with the at least one processor to, in a case where it is detected that the predefined power saving scheme does not operate properly, cause the apparatus to enter an active mode.

19. The apparatus according to claim 13, wherein the detecting comprises toggling between a power save enabled mode and an active mode periodically and calculating a number of the received packets during the power save enabled mode and the active mode.

20. The apparatus according to claim 13, wherein the at least one memory including the computer program code is configured with the at least one processor to cause the apparatus to send data to said network node and use a broadcast address or a multicast address as a destination address to make a distinction in a determination engine; and determine whether the broadcast or the multicast data is received and that unicast data is not received or vice versa in response to the sending.

21. The apparatus according to claim 20, wherein the data using the broadcast address or a multicast address is sent right after the apparatus goes into a sleep mode for a first time.

22. The apparatus according to claim 13, wherein the at least one memory including the computer program code is configured with the at least one processor to cause the apparatus to send frames having a proprietary level data-format to said network node in such way that the destination address is the same as the source address so as to cause a frame to be buffered into said network node.

23. The apparatus according to claim 22, wherein the detecting comprises detecting if the packet is echoed back normally to the apparatus in the received packets.

24. The apparatus according to claim 22, wherein the at least one memory including the computer program code is configured with the at least one processor to cause the apparatus to receive a beacon in response to the sending; and based on the receiving pull the frame back from said network node.

25. An apparatus comprising:
   means for receiving packets from a network node and using at least the received packets to detect if a predefined power saving scheme of said network node operates incorrectly; and
   means for adjusting the predefined power saving scheme to an interoperability power saving communication mode when wirelessly connected with said network node if it is detected that the predefined poser saving scheme operates incorrectly;
   wherein said detecting comprises probing types of power saving protocol tests and using lower and higher-layer protocol information to detect if some data to be received is missing.

26. The apparatus according to claim 25, wherein the means for adjusting includes one of: disabling the predefined power saving scheme, and switching entering into the predefined power savings scheme only after a predefined inactivity period, wherein the predefined inactivity is substantially longer than in "normal" operation.

27. A device comprising:
   one or more processors configured for receiving packets from an associated access point and use at least the received packets to detect whether the associated access point is operating according to rules of a predefined power saving scheme for communicating in a wireless local area network environment, and
   switching to an interoperability power saving communication mode in a case of detecting that the associated access point is not operating according to the rules of the predefined power saving scheme;
   wherein said detecting comprises probing types of power saving protocol tests and using lower and higher-layer protocol information to detect if some data to be received is missing.

28. The device according to claim 27, wherein the switching to the interoperability power saving communication modes comprises one of disabling power saving scheme, and switching entering into power savings scheme only after a predefined inactivity period, wherein the predefined inactivity is substantially longer than in "normal" operation.

29. A chipset comprising:
   a first processor configured to receive packets from a wirelessly connected apparatus and use at least the received packets to detect whether a predefined power saving scheme of said wirelessly connected apparatus operates incorrectly; and
   a second processor coupled with the first processor and configured to adjust the predefined power saving scheme to an interoperability power saving mode when wirelessly connected with said wirelessly connected apparatus if it is detected that the predefined power saving scheme operates incorrectly;
   wherein said detecting comprises probing types of power saving protocol tests and using lower and higher-layer protocol information to detect if some data to be received is missing.

30. The chipset according to claim 29, wherein the adjusting includes switching to a new compatible power scheme when the predefined power saving scheme is disabled for the wirelessly connected apparatus in response to detecting that the predefined power saving scheme operates incorrectly.

31. The chipset according to claim 29, wherein said detecting comprises monitoring and registering events that can reveal states where a mobile device is missing downlink packets.

32. A chipset comprising:
   a first processor configured for receiving packets from an associated access point detecting using at least the received packets whether the associated access point is operating according to rules of a predefined power saving scheme for communicating in a wireless local area network environment; and
   a second processor coupled with the first processor and configured for switching to an interoperability power saving communication mode in the case of detecting that the associated access point is not operating according to the rules of the predefined power saving scheme;
   wherein said detecting comprises probing types of power saving protocol tests and using lower and higher-layer protocol information to detect if some data to be received is missing.

33. The chipset according to claim 32, wherein the switching to the interoperability power saving communication modes comprises one of: disabling power saving scheme, and switching entering into power savings scheme only after a predefined inactivity period, wherein the predefined inactivity is substantially longer than in "normal" operation.

* * * * *

UNITED STATES PATENT AND TRADEMARK OFFICE
CERTIFICATE OF CORRECTION

| | | |
|---|---|---|
| PATENT NO. | : 8,705,375 B2 | Page 1 of 1 |
| APPLICATION NO. | : 11/807170 | |
| DATED | : April 22, 2014 | |
| INVENTOR(S) | : Mikko Jaakkola et al. | |

It is certified that error appears in the above-identified patent and that said Letters Patent is hereby corrected as shown below:

In the Claims

In Claim 13:
Column 11, line 63, --receive-- should be inserted before "packets".

In Claim 13:
Column 11, line 64, --to-- should be inserted before "detect".

Signed and Sealed this
Twenty-fourth Day of June, 2014

Michelle K. Lee
*Deputy Director of the United States Patent and Trademark Office*